United States Patent Office 3,333,319
Patented Aug. 1, 1967

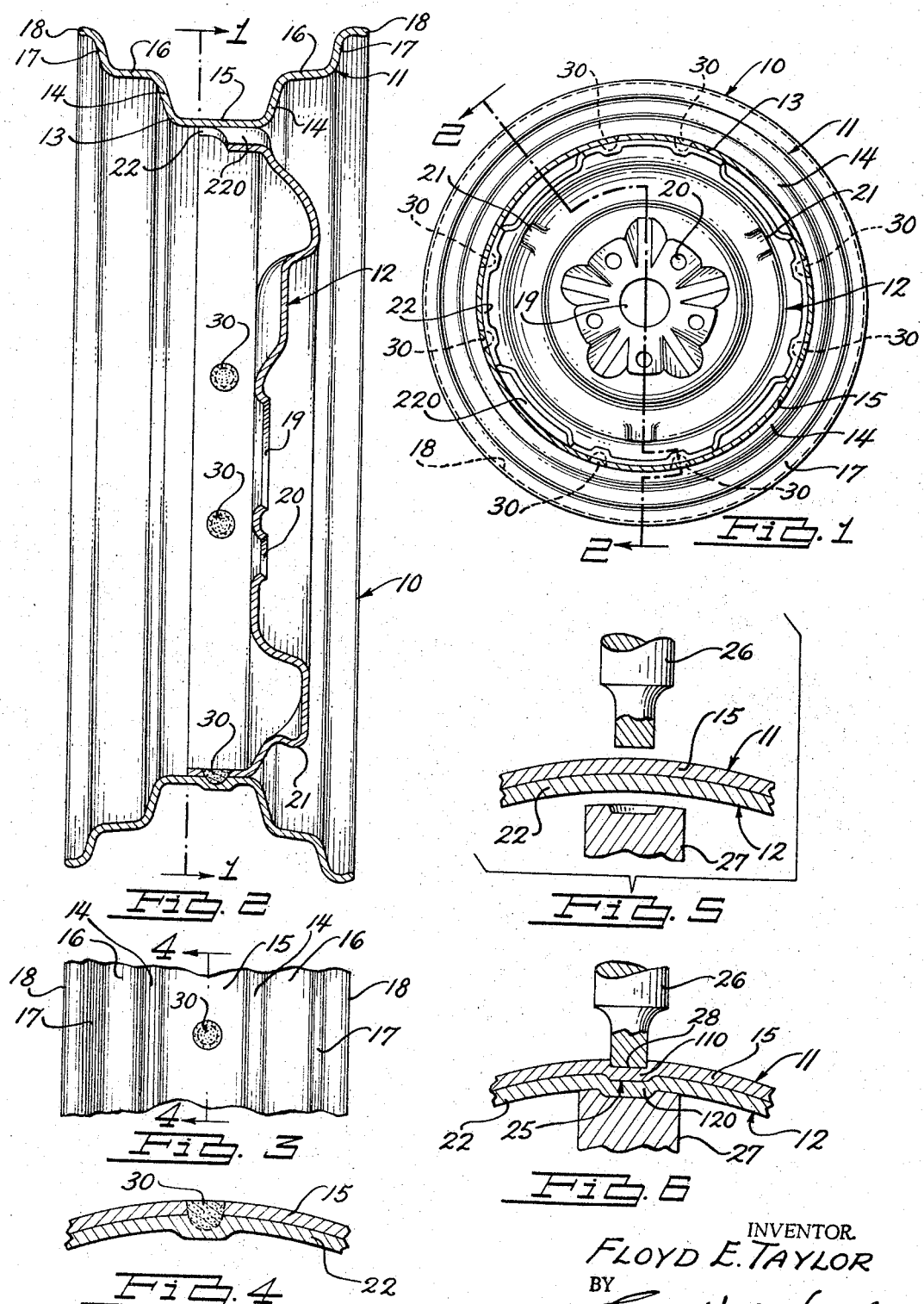

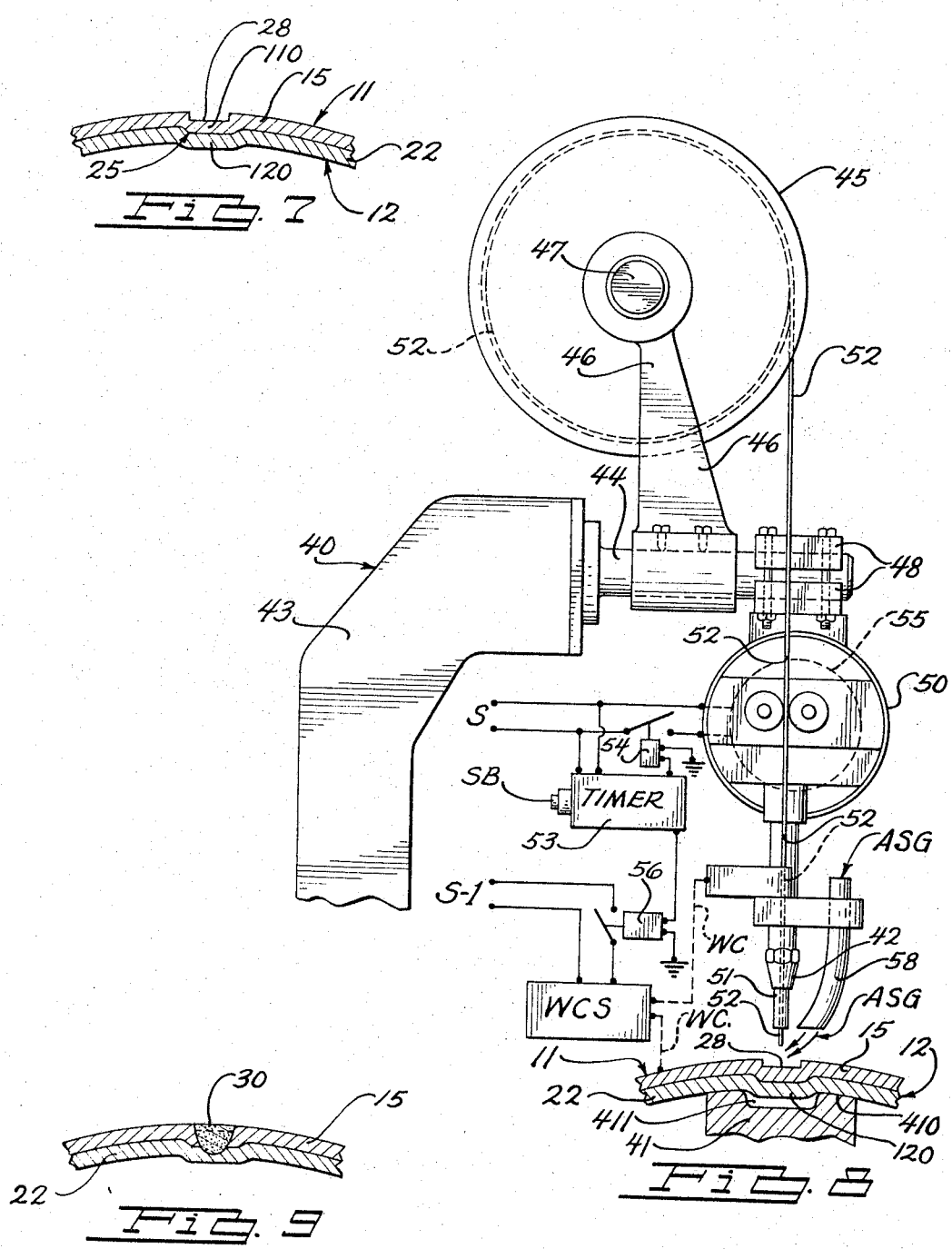

3,333,319
METHOD OF MANUFACTURING VEHICLE WHEELS
Floyd E. Taylor, Bloomfield Hills, Mich., assignor to Swift-Ohio Corporation, Kenton, Ohio, a corporation of Ohio
Filed May 21, 1965, Ser. No. 457,717
3 Claims. (Cl. 29—159.01)

This invention relates to improvements in the manufacture of automotive vehicle wheels and other multiple piece structures secured together frictionally and then welded.

In producing steel wheels for modern passenger automobiles and trucks, the wheel rim is made in one operation, and the wheel spider is formed in another. The wheel spider is then accurately pressed within the wheel rim, and the two elements of the vehicle wheel are welded together. The wheel rim, preferably of a drop center type, is formed circular in shape and butt welded together and the weld flash is trimmed from the weld. The wheel spider is stamped in its desired shape with a plurality of axially disposed circumferentially spaced outer flanges which telescope accurately and tightly into the annulus of the drop center rim when the wheel spider and wheel rim are pressed together. Each said outer flanges of the spider is welded to the drop center of the rim at preferably two points along each said flange.

Extremely heavy road shocks occur on vehicle wheels when modern motor vehicles are driven at relatively high speeds and run over a bump or into pockets in the road, which road shocks place terrific impact stresses on the vehicle wheels. While such impacts are absorbed by conventional spring wheel suspensions employed between the vehicle chassis and its wheels, nevertheless, the vehicle wheels initially receive and absorb these extremely high road shock stresses. Accordingly, the assured quality of the weldment between the wheel rim and wheel spider has become an item of prime importance in automotive vehicle wheel construction. Heretofore, the wheel spider was secured to the wheel rim by resistance spot welding which is not readily susceptible to inspection, and, when relatively weak or poor welds occur, they are not normally detected.

Wtih the foregoing in view, the primary object of the instant invention is to provide an improved method of welding the flanges of vehicle wheel spiders to drop center wheel rims in which welds of great strength are assured, and, wherein malformed welds, if and when such should occur, are readily detectable by inspection.

A further object of the invention is to provide an improved method of welding the flanges of wheel spiders to the drop center of a wheel rim in which a strong complete weld is assured even though the mating of the spider flange to the drop center rim is not maintained under high pressure at the time of the weld.

Still another object of the invention is to provide an improved method of manufacturing vehicle wheels comprising forming a drop center wheel rim and the flanged spider thereof separately, pressing the spider flanges within the wheel rim accurately assembling the same firmly into a vehicle wheel assembly, coining said vehicle wheel and spider forming at least two depressed interlocks between the central base portion of the drop center rim and said spider flanges, and then arc welding said wheel rim and said wheel spider at said interlocks and simultaneously filling the depression at each said interlock.

Other objects of the invention will become apparent by reference to the following detailed description taken in connection with the accompanying drawings, in which:

FIG. 1 is a side elevational view of a typical vehicle wheel in which the wheel rim and wheel spider are secured in assembled relationship according to the method of the invention.

FIG. 2 is an enlarged sectional view of the completely assembled and welded wheel rim taken on the line 2—2 of FIG. 1.

FIG. 3 is a fragmentary plan view of a portion of the wheel rim showing a completed weldment.

FIG. 4 is a longitudinal sectional view taken on the line 4—4 of FIG. 3 showing a completed weldment.

FIG. 5 is an exploded cross sectional view of a coining die set with a portion of the wheel rim and spider flange inserted therebetween.

FIG. 6 is a fragmentary cross sectional view of the wheel rim and spider flange being coined and interlocked at an area to be welded.

FIG. 7 is a fragmentary cross sectional view of a completely coined and interlocked wheel rim and spider flange removed from the coining dies ready for welding.

FIG. 8 is a more or less diagrammatic view of a preferred method of accomplishing the weldment at one of the coined and interlocked areas prepared for the weldment.

FIG. 9 is a sectional view of a completed weldment, the portion above the dotted line indicating the volume of weld rod fill.

Referring now to the drawings wherein like reference characters refer to like and corresponding parts throughout the several views, the improved method of the invention for permanently securing together frictionally or pressed fit elements is disclosed herein in connection with the manufacture of vehicle wheels 10 wherein the wheel rim 11 has a suitably flanged wheel spider 12 press fit therein to form a wheel assembly. The said vehicle wheel rim 11 and wheel spider 12 are then coined and interlocked at each area or point of weld, and are permanently secured together by arc welding at weldments 30 as hereinafter described to provide such positive securement between the wheel rim 11 and spider 12 as to withstand the repeated heavy road shocks on vehicle wheels 10 that occur during driving a vehicle at relatively high speeds over rough, bumpy or hole pocked roads.

In such vehicle wheels 10, the wheel rim 11 is of conventional drop center construction usually rolled from a butt welded annular blank to the desired cross sectional configuration. The finished drop center rim 11 preferably consists of a central channel or drop center 13 having side walls 14 and a base 15, a tire bead seat 16 extending laterally outwardly from each of the said channel side walls 14, and a curved flange 17 extending upwardly and outwardly from each tire bead seat 16, the said flanges 17 terminating in an outer lip 18 at each side of the wheel rim. The wheel spider 12 is generally provided with a suitable hub aperture 19, wheel securing bolt holes 20 and a plurality of hub cap nubs 21 by means of which a hub cap, not shown, is removably secured to the wheel. The outer periphery of the spider 12 is preferably segmentally flanged at suitable intervals at 22 to conform in frictional fitting relationship with the inner periphery of the base 15 of the central channel 13 or drop center of the drop center rim 11 when pressed therein. It will be noted that the spider 12 is scalloped at 220 between the flanges 22 thereof to provide structural strength to and vents through the wheel 10, and to permit the flanged portions 22 of the spider 12 to be pressed accurately within the drop center rim 11.

After the wheel spider 12 is pressed accurately into its proper assembled relationship within the wheel rim 11, the flanges 22 of the spider 12 and the base 15 of the drop center rim 11 are placed between coining dies 26 and 27 at each point of weld as shown in FIG. 5, and are coined as shown in FIG. 6 to provide radially inwardly depressed preferably frusto-conical interlocks 26 and preferably circular weld pockets 28 concentric therewith leaving tightly mating depressions 110 and 120 respectively in the base 15 of the drop center rim 11 and the flange 22 of the wheel spider 12 at each point of weld generally designated by the numeral 30. This coining and interlocking not only provides a wheel assembly 10 of sufficient strength to admit of handling prior to accomplishing the welds 30 as hereinafter described, but causes the weld 30 to have greater strength than otherwise would be possible. Although single station coining dies 26 and 27 are illustrated herein, it is preferable that coining at the two points of weld at each segment of the spider flange be accomplished simultaneously. This would require a dual station coining operation which would be obvious to those skilled in the art.

Upon the completion of the above described assembly of the wheel rim 11 and spider 12 of a vehicle wheel, the said wheel elements are then secured together by arc welding as hereinafter described, either at a single welding station or at a dual welding station. In the latter event which may be preferred, both arc welds 30 in each segment of the spider flange 22 would be accomplished simultaneously.

Referring now particularly to FIG. 8 wherein a single station arc welding apparatus 40 is disclosed more or less diagrammatically, a vehicle wheel 10 completely assembled and coined and interlocked as hereinbefore described is placed on a suitable mandrel 41 or is otherwise supported with a weld pocket 28 thereof disposed concentrically below the welding head 42 of the arc welding apparatus 40. The mandrel 41 is shown to be curved on its upper surface 410 to conform to the radius of the radial inner surface of the spider flange 22. A suitable depression 411 is provided in the mandrel 41 so that circular depression 120 of the spider flange 22 is completely unsupported. Inasmuch as no welding pressure is applied on the wheel rim 11 or spider 12 of a vehicle wheel 10 during welding, the said wheel 10 need not be hung on a mandrel as indicated in FIG. 8, but it may be positioned free standing in a roller cradle (not shown) with a weld pocket 28 disposed concentrically below the welding head 42 of the arc welding apparatus 40.

The arc welding apparatus 40 includes a frame member 43 having a fixed horizontally disposed cantilever bar 44 extending therefrom on the inner portion of which is mounted a welding wire reel 45 by means of an adjustable bracket 46 and a reel shaft 47. Depending from the outer portion of the said cantilever bar 44 is an adjustable bracket 48 from which is suspended an electric powered welding wire straightening and feed unit 50 through the lower nozzle end 51 of which welding wire 52 is fed during a welding cycle responsive to a timer 53 which closes and opens a solenoid operated welding wire feed switch 54 which provides power from a suitable source of electric current S to an electric motor and speed reducer 55 located within the wire straightening and feed unit 50. Welding current WC is supplied from a source of electric current S-1 through a source of welding current WCS to the welding wire 52 and the vehicle wheel 10 during each welding cycle responsive to the said timer 53 and a solenoid operated welding current control switch 56. The details of the wire feed and welding circuits need not be more specifically described inasmuch as such are conventional and are not a part of the instant invention.

When a welding cycle is started, for example, by pressing the starter button SB of the timer 53, both solenoid switches 54 and 56 are closed, the welding wire feed unit 50 is started and welding current WC is made available to the welding wire 52 and the vehicle wheel 10 from a welding current source WCS. The welding wire 42 is fed down into the bottom of a weld pocket 28 in the wheel rim 11, and, upon contact therewith an arc is established and the wheel rim 11 and spider 12 are welded together forming a weld substantially as shown in FIG. 9. The welding cycle is so timed that not only are the wheel rim and spider arc welded together, but, the weld rod fed into the arc is commingled and united with the molten metal at the point of weld and fills the weld pocket 28 provided by the previous coining operation. The timing of the welding cycle is preferably such that the timer 53 shuts off the weld rod feed unit 50 and the supply of welding current WC from the welding current source WCS. At the completion of the weld 30, the welding wire 52 automatically burns back to substantially the position shown in FIG. 8 ready for the initiation of the next welding cycle. During each welding cycle, the arc weld is preferably shielded from ambient air by a suitable arc shielding gas ASG which is supplied in the proper amount to the weld through a shielding gas nozzle 58 as indicated in FIG. 8.

The foregoing method provides uniform and fully welded anchorage welds 30 between the rim 11 and spider 12 of the vehicle wheel 10. In the event of malfunction of the arc welding equipment employed, bad welds can be observed readily by inspection of the filling of the weld pockets or craters 28 or by the condition of the protuberance below the interlocks 25 between the flange 22 of the wheel spider 12 and base 15 of the drop center 13 of the wheel rim 11. By providing coined interlocks with weld pockets 28 at each point of weld, and simultaneously filling the weld pockets during welding, makes an effective integral whole at each completed weld 30 and at the area of the coined interlocks thereat, which welds 30 are more uniformly perfect and consequently stronger than they otherwise would be.

Although but a single illustrative manner of carrying out the method steps of the instant invention has been disclosed and described herein, it is obvious that many alterations may be made in the method steps as disclosed to accomplish economically and rapidly the manufacture of accurate wheel trim assemblies with positive securement between the drop center rim and spider thereof capable of resisting shock stresses of great magnitude to which such assembled structures are subjected, all without departing from the spirit and scope of the method of the invention as defined by the appended claims.

I claim:
1. The method of manufacturing vehicle wheels consisting of a wheel rim and a flanged spider comprising the steps of
    pressing the flanged spider within said wheel rim to its precise required location therein,
    coining said rim and spider flange at points of weld forming a mechanical interlock therebetween including a weld pocket, and
    arc welding the wheel rim and spider flange together at each said interlock simultaneously filling said weld pocket with molten welding wire forming an integral whole at each said interlock.

2. The method of manufacturing vehicle wheels consisting of a wheel rim and a flanged spider comprising the steps of
    pressing the flanged spider within said wheel rim to its precise required location therein,
    coining said rim and spider flange at points of weld forming a frusto-conical mechanical interlock therebetween simultaneously forming a cylindrical weld pocket of substantial depth concentric with and above said interlock, and
    arc welding the wheel rim and spider flange together at each said interlock simultaneously filling said weld pocket with molten welding wire forming an integral whole between said rim and spider at each said interlock.

3. The method of manufacturing vehicle wheels consisting of a drop center rim and a flanged spider comprising the steps of pressing the flanged spider within drop center portion of said wheel rim to its precise required location therein, coining said drop center portion of said rim and said spider flange at selected points of weld therebetween forming a frusto-conical mechanical interlock therebetween simultaneously forming a cylindrical weld pocket of substantial depth concentric with and above said interlock, and arc welding the wheel rim and spider flange together at each said interlock simultaneously filling said weld pocket with molten welding wire forming an integral whole between said drop center portion of said wheel rim and said spider at each said interlock.

References Cited

UNITED STATES PATENTS

| | | | |
|---|---|---|---|
| 1,741,716 | 12/1929 | Hunt | 301—63 |
| 2,830,168 | 4/1958 | Taylor | 219—91 |
| 2,992,857 | 7/1961 | Lemmerz | 301—63 |
| 3,117,369 | 1/1964 | Albert | 29—159.01 |

JOHN F. CAMPBELL, *Primary Examiner.*

THOMAS H. EAGER, *Examiner.*